United States Patent

[11] 3,627,745

| [72] | Inventors | Henry L. Hsieh<br>Bartlesville, Okla.;<br>Francis X. Mueller, Jr., Louisville, Ky. |
|---|---|---|
| [21] | Appl. No. | 50,956 |
| [22] | Filed | June 29, 1970 |
| [45] | Patented | Dec. 14, 1971 |
| [73] | Assignee | Phillips Petroleum Company |

[54] TERMINATION OF DIENE POLYMERIZATION
4 Claims, No Drawings

[52] U.S. Cl. ..................................... 260/94.7,
260/85.1, 260/96, 260/94.2 M
[51] Int. Cl. ..................................... C08d 304,
C08d 308, C08d 138

[50] Field of Search............................................. 260/85.1,
94.7 A, 96, 94.3 M

[56] References Cited
UNITED STATES PATENTS

| 3,193,590 | 7/1965 | Asieh .......................... | 260/94.7 X |
| 3,281,383 | 10/1966 | Zelishski et al. ............... | 260/23.7 |

*Primary Examiner*—Joseph L. Schofer
*Assistant Examiner*—William Hammond
*Attorney*—Young and Quigg

ABSTRACT: A method of terminating the polymerization of monomers in which polymerization there is formed a metal-terminated polymer by introducing into the reaction mixture a lactone.

TERMINATION OF DIENE POLYMERIZATION

This invention relates to terminating monomer polymerization by the use of lactomes.

The polymerization of conjugated dienes to form polymers is well known. One method for conducting this reaction is to contact the diene with a hydrocarbyl alkali metal compound with the reaction being terminated at some point in order to control the properties of the ultimate polymer product.

It has now been discovered that such reactions can be terminated by certain afterdefined lactomes; their use produces an increase in polymer Mooney viscosity, a decrease in polymer cold-flow and, when used to terminate reactions producing certain block copolymers, a large increase in the green tensile strength, that is, in the tensile strength of the uncured polymer.

Accordingly, this invention provides a method for terminating the polymerization of conjugated dienes which involves introducing a lactone into the reaction mixture.

Accordingly, it is an object of this invention to provide a terminating agent which can be easily used and the use of which produces a polymer of improved properties.

The method of this invention applies to polymerization processes well defined in the art and includes the polymerization and copolymerization of conjugated dienes and aromatic hydrocarbons containing a vinylidene group. The copolymer molecule can have either random or block distribution of monomers therein. In particular, this invention is particularly useful in the production of rubbery polymers which contain at least about 50 weight percent conjugated diene.

The polymerization process will employ an initiator of the alkali metal type which generally has the formula $R(M)_x$, in which R is a hydrocarbyl radical, M is an alkali metal and $x$ is an integer of from 1 to 4. Such initiators are well known, n-butyllithium being one of the most frequently employed initiators.

The use of the lactone according to the method of this invention is employable in polymerization processes which are conducted under customary process conditions. In general, the process is conducted either with or without the use of a diluent, at a temperature from about −30° to 250° C. and at a pressure sufficient to maintain the reaction mixture substantially as a liquid, the initiator being employed in an amount of from about 0.1 to about 20 gram milliequivalents of metal per 100 grams of monomer, whether the initiator is an alkali metal type or a hydrocarbyl alkali metal compound.

The lactone which is employed is represented by the generic formula

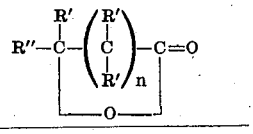

in which R'' is hydrogen or a radical of the formula

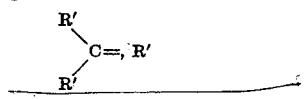

is hydrogen, alkyl, cycloalkyl, alkenyl, cycloalkenyl and aryl and combinations thereof; $n$ is the integer 1, 3 or 4; and, the total carbon atoms in the R' and R'' substitutents is in the range of 1 to about 12. When R'' is the specified radical, no R' is attached to the carbon atom to which the specified radical is attached.

While the preferred lactone is ε-caprolactone, other lactones which can be employed are β-propiolactone, δ-valerolactone and lactones corresponding to acids such as 2-methyl-3-hydroxypropionic acid, 3-benzyl-3-hydroxypropionic acid, 3-(3,5-diethylcyclohexyl)-5-ethyl-6-hydroxycaproic acid and 2,2-dimethyl-4-propenyl-3-hydroxy-3,5-heptadienoic acid.

The lactone can be introduced into the polymerization reaction mixture in any suitable manner. It can be added to the mixture at any time during or after the polymerization reaction and, it can be added in small quantities either intermittently or continuously during the course of the reaction. The amount of lactone which is added is from about 0.02 to about 1 part by weight per 100 parts by weight of monomer(s) employed. Generally, the lactone is employed in an amount of about 0.2 to about 0.6 parts per 100 parts by weight of the monomer(s) (phm).

Lactone terminating agents have several advantages over many of the conventionally employed terminating agents. They are generally soluble in such hydrocarbons as are employed in diluents in the reaction; they are easily handled because they are generally unaffected by contact with air. Further, their effectiveness is not significantly dependent upon a stoichiometric relationship to the concentration of polymer-alkali metal bonds, this factor simplifying their employment.

The method of this invention is illustrated by the following examples.

EXAMPLE I

Butadiene/styrene block copolymers were prepared in a series runs by polymerizing 60 parts by weight of 1,3-butadiene with 40 parts by weight of styrene in 780 parts by weight of cyclohexane diluent. The reaction was conducted at 70° C. employing sec-butyllithium as the initiator in an amount of 2.6 gram millimoles per 100 grams of monomers (mhm). In all runs, the styrene was polymerized in cyclohexane for one-half hour, during which period the styrene was substantially completely polymerized. The butadiene was then introduced into the reaction mixture and polymerization was continued for an additional one-half hour.

After this second ½-hour period, ε-caprolactone was employed as a terminating agent, in all runs except run 1, in the quantities indicated below, the caprolactone being introduced and the reaction being continued for 10 minutes thereafter at 70° C. To each reaction mixture there was then added a 10 weight percent solution of 2,2'-methylene-bis(4-methyl-6-tert-butylphenol), a conventional antioxidant, in a mixture comprised of equal parts of isopropyl alcohol and toluene, the amount of mixture added providing about 1 part by weight of antioxidant per 100 parts by weight of polymer. The reaction mixture of each run was individually coagulated with isopropyl alcohol and the polymer was individually separated and dried. Conversion in all runs was 100 percent and each polymer was gel-free.

The results of the runs, all of which employed procedures conventional in the art with the exception of the ε-caprolactone addition, were as follows:

| Run No. | Caprolactone added, phm. | Mooney viscosity, MS-4 at 280° F. | Inherent viscosity | Green tensile, p.s.i. |
|---|---|---|---|---|
| 1 | 0 | 20 | 0.52 | <200 |
| 2 | 0.1 | 30 | 0.68 | 3,200 |
| 3 | 0.2 | 41 | 0.75 | 4,300 |
| 4 | 0.3 | 53 | 0.81 | 4,450 |
| 5 | 0.4 | 55 | 0.78 | 4,100 |
| 6 | 0.5 | 56 | 0.79 | 4,100 |
| 7 | 0.6 | 57 | 0.79 | 3,900 |
| 8 | 0.7 | 55 | 0.78 | 4,100 |
| 9 | 0.8 | 56 | 0.79 | 4,400 |

The above data illustrate the operability of the method of this invention and the effect of various amounts of lactone addition to the reaction.

EXAMPLE II

A series of runs was conducted polymerizing 100 parts by weight of 1,3-butadiene in 780 parts by weight of cyclohexane, using 1.2 mhm of n-butyllithium as the initiator.

After polymerization for 1 hour at 70° C., ε-caprolactone was introduced into the reaction mixture, a different quantity being introduced in each instance. Polymerization termination by the lactone was conducted at 70° C. for 10 minutes and thereafter antioxidant addition and polymer recovery were carried out as in example I. The results of this series of runs, conventional in all respects with the exception of the addition of the caprolactone, and in which conversions were 100 percent and the polymers were gel-free, were as follows:

| Run No. | Caprolactone Added, phm | Mooney Viscosity, MS-4 at 280° F. | Inherent Viscosity |
|---|---|---|---|
| 10 | 0 | 8 | 1.37 |
| 11 | 0.1 | 25 | 1.94 |
| 12 | 0.2 | 25 | 1.93 |
| 13 | 0.3 | 26 | 2.01 |
| 14 | 0.4 | 27 | 1.99 |
| 15 | 0.6 | 28 | 1.99 |
| 16 | 0.8 | 26 | 1.92 |

The above data illustrate the operability of the method of this invention when polymerizing a conjugated diene.

EXAMPLE III

A series of runs was conducted as in example 1 except that in each, 1.5 parts by weight of tetrahydrofuran were introduced into the initial reaction mixture, as a randomizer, to promote the production of random copolymers from the 75 parts of 1,3-butadiene and 25 parts of styrene, employing 1.2 mhm n-butyllithium as initiator. Results were as follows:

| Run No. | Caprolactone Added, phm | Mooney Viscosity, MS-4 at 280° F. | Inherent Viscosity |
|---|---|---|---|
| 17 | 0 | 12 | 1.16 |
| 18 | 0.1 | 34 | 1.46 |
| 19 | 0.2 | 24 | 1.33 |
| 20 | 0.3 | 28 | 1.37 |
| 21 | 0.4 | 25 | 1.36 |
| 22 | 0.6 | 22 | 1.34 |
| 23 | 0.8 | 24 | 1.36 |

The above data illustrates the effectiveness of the method of this invention when producing random copolymers.

It will be evident from the foregoing that various modifications can be made to the method of this invention. Such, however, are considered as being within the scope of this invention.

What is claimed is:

1. A method for terminating the lithium hydrocarbon initiated polymerization of conjugated diodefin monomers in which polymerization there is formed a lithium-terminated polymer which comprises introducing into the polymerization reaction mixture a lactone having the formula

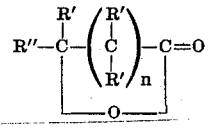

in which R'' is hydrogen or a radical of the formula $$\begin{array}{c} R' \\ \diagdown \\ C=, R' \\ \diagup \\ R' \end{array}$$

is hydrogen, alkyl, cycloalkyl, alkenyl, cycloalkenyl and aryl and combinations thereof; $n$ is an integer having the value of 1, 3 or 4, and the total carbon atoms in the R' and R'' substituents is in the range of one to 12.

2. The method of claim 1 in which said lactone is introduced into said reaction mixture in an amount from about 0.02 to about 1 part by weight per 100 parts of monomer.

3. The method of claim 1 in which said lactone is ε-caprolactone.

4. The method of claim 3 in which said lactone is introduced into said reaction mixture in an amount from about 0.2 to about 0.6 parts by weight per 100 parts of monomer.

* * * * *

UNITED STATES PATENT OFFICE
CERTIFICATE OF CORRECTION

Patent No. 3,627,745              Dated  December 14, 1971

Inventor(s)  Henry L. Hsieh et al.

It is certified that error appears in the above-identified patent and that said Letters Patent are hereby corrected as shown below:

Claim 1, column 4, line 12, "diodefin" should read -- diolefin --; the formula $$\begin{matrix} R' \\ R' \end{matrix} \!\!> C =, R' \qquad \text{should read} \qquad \begin{matrix} R' \\ R' \end{matrix} \!\!> C =$$

line 29, should read

-- R' is hydrogen, alkyl, cycloalkyl, alkenyl, cycloalkenyl and aryl --; line 30, insert -- about -- after "to".

Signed and sealed this 13th day of June 1972.

(SEAL)
Attest:

EDWARD M. FLETCHER, JR.
Attesting Officer

ROBERT GOTTSCHALK
Commissioner of Patents